FALSE ALARM RATE STABILIZER

Filed March 2, 1960

INENTORS.
JOHN W. MARTIN
JOHN F. HULTQUIST
DONALD W. MAC GLASHAN
Robert T. Killman 3,181,157
Patented Apr. 27, 1965

3,181,157

FALSE ALARM RATE STABILIZER

John W. Martin, Timonium, John F. Hultquist, Towson, and Donald W. MacGlashan, Timonium, Md., assignors to The Bendix Corporation, a corporation of Delaware Filed Mar. 2, 1960, Ser. No. 12,296
9 Claims. (Cl. 343—17.1)

This invention relates generally to data systems that utilize digital data from a quantitizer which produces digital data from a signal which contains noise.

When a signal which is in the nature of a video signal is converted into digital form it is necessary to process the signal through a quantitizing device which establishes the threshold for the digital signal output. This threshold is normally set at a level which is compatible with the equipment which is to utilize the digital data particularly with reference to the false alarm rate which the data utilization system can tolerate. The criterion for establishing compatibility can be understood from a consideration of the nature of the operation of systems of this type.

In any data system which converts a video-type signal which includes background noise into a digital signal it is necessary to establish in a quantitizing device the threshold which discriminates between those amplitudes which are to be considered signals and those considered to be noise. Due to the random nature of the noise, however, the establishment of any threshold does not preclude the occurrence of noise spikes which exceed the threshold and thus insofar as the equipment is concerned are indistinguishable from true signals. The rate at which these false alarm type of signals occur depends upon the setting of the threshold in the quantitizer since the statistical distribution of the amplitudes in the background noise indicates that some noise spikes will occur which exceed the threshold at any threshold level. Due to the nature of such systems, therefore, the data utilization device will be supplied with true signals which occur when the threshold of the quantitizer is exceeded intermixed with false alarm signals resulting from noise spikes, the rate of occurrence of which will be directly related to the setting of the threshold level and the statistical distribution of the amplitudes of the noise components. Accordingly the data utilization device must be adapted to accommodate a false alarm rate of some predetermined level. An example of a system with which this invention may be combined is described in U.S. Patent No. 2,907,027, granted September 29, 1959 to C. W. Uskavitch for "Computer Control Circuitry." For optimum system performance it is necessary to maintain the quantitizer operating in the region of minimum detectable signal to obtain maximum sensitivity and at the same time the output applied to the data utilization device must possess a false alarm rate of a constant average value in order that the terminal equipment function properly.

It is an object of the present invention to provide improved data handling devices.

A further object of the invention is to provide an improved arrangement for converting a signal in noise into a pure digital signal.

A still further object is to provide an improved system for stabilizing the false alarm rate of a data quantitizer.

These and other objects of the invention will be apparent from the following detailed description taken in conjunction with the accompanying drawing wherein.

In accordance with the present invention an amplitude signal is transformed in a quantitizer into a digital signal with reference to a threshold established by a frequency comparator which compares the output signal rate of the quantitizer with a signal rate established by a reference oscillator. With this arrangement the false alarm rate can be established by adjusting the frequency of the reference oscillator and will thereafter be maintained at substantially the selected rate independent of analogue type drifts in the system and changing noise level in the signal channel.

Figure 1:
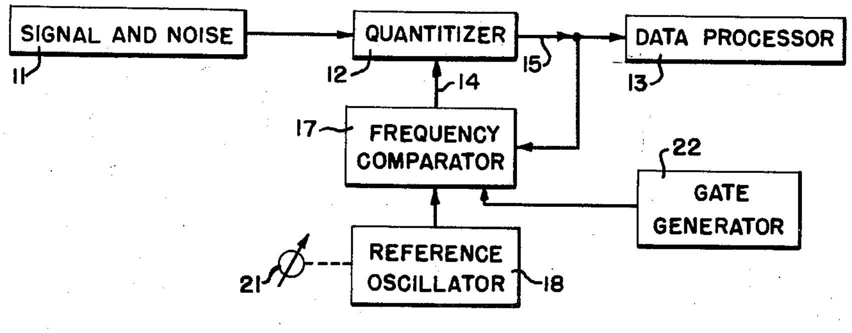
FIG. 1 is a block diagram of a system in accordance with the invention.

Referring now to FIG. 1 the system of the invention is shown as applied to a data system having a signal source 11 which applies signals to a quantitizer 12 the output of which supplies digital signals to a data processor 13. The nature of the signals supplied by the signal source 11 provides an amplitude varying signal which exists relative to a noise level inherent in the system which generates the signal. In order to convert signals of this type to digital signals it is necessary for the quantitizer 12 to operate relative to an adjustable threshold controlled by input 14 such that the quantitizer 12 produces an output whenever the input signal from device 11 exceeds the threshold established at the input 14. Signals which exceed this threshold are transformed into uniform pulse signals and are applied on line 15 to the device 13 as digital data pulses. As previously set forth a certain portion of these pulses will be false alarms due to the nature of the system.

In order to stabilize the false alarm rate the output of the quantitizer 12 is applied to a frequency comparator 17. The frequency comparator 17 may be any device which produces a direct voltage output in accordance with the difference in frequency of two input signals, and in which the zero point is not subject to drift. The absence of drift in an absolute sense will, of course, be determined by the characteristics of the system with respect to this requirement. A second input to the comparator 17 is obtained from a reference oscillator 18 coupled to the comparator 17. The reference oscillator 18 may be adjustable in frequency by means of the control 21. Adjustment of the frequency of the reference oscillator 18 with the control 21 has the effect of adjusting the false alarm rate of signals on line 15 applied to the data device 13 since the adjustment of the frequency of oscillator 18 will alter the direct voltage output of the comparator 17. A gate generator 22 which may be synchronized with the system to provide periodic sampling in relation to any data interval may be arranged to control the comparator 17 to operate to change the threshold on line 14 only during sampling intervals. In the event that the system is to operate continuously without sampling the data, the gate generator 22 may be omitted or condition the comparator 17 to continuously control the threshold on line 14.

In the operation of the system of FIG. 1 signals on line 15 are applied to the comparator 17 where they are compared in frequency with signals derived from the reference oscillator 18. The frequency comparator 17 generates a D.C. level which varies around an established threshold level set for the quantitizer 12. As the rate of false alarm signals on line 15 varies the D.C. signal generated by the comparator 17 will vary to adjust the threshold at input 14 to maintain the false alarm rate output on line 15 substantially constant. In sampled data systems the comparator 17, of course, will be arranged to maintain the D.C. signal generated between sample times in accordance with the last generated threshold control signal. The operation of the system in this manner permits the data processor 13 to operate with respect to its normally expected false alarm rate irrespective of changes in the input system.

Figures 2, 3:
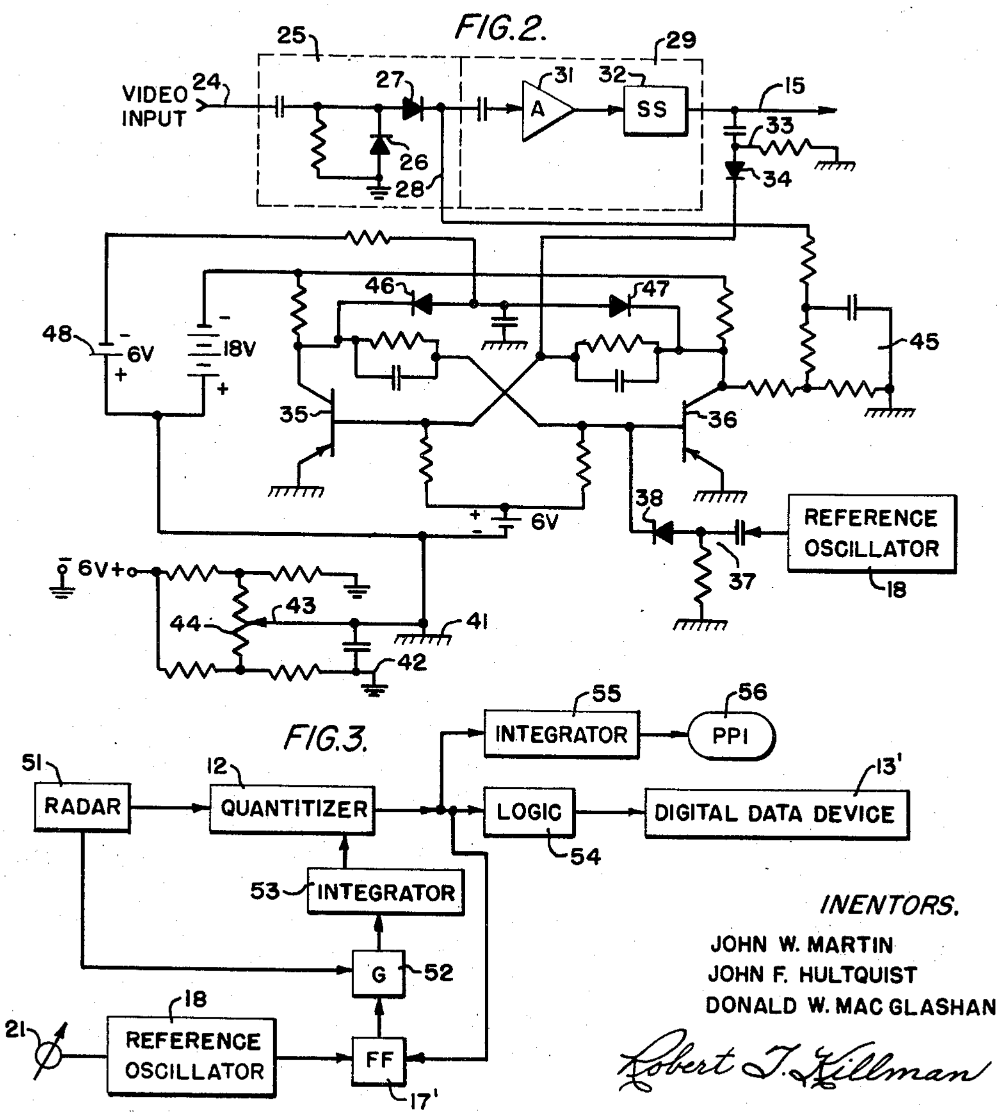
FIG. 2 is a schematic diagram of an embodiment of the invention.
FIG. 3 is a block diagram of the invention as applied to a radar system.

Referring now to FIG. 2 the schematic wiring diagram of a specific embodiment of the invention is shown in which video type signals and noise are applied at an input terminal 24. Signals from the terminal 24 are applied to a baseline clipping circuit 25 which comprises a shunt diode 26 and a series diode 27 operating with respect to a D.C. threshold voltage applied on line 28. The baseline clipping circuit 25 applies signals which exceed the threshold level established on line 28 to a digitizer 29 where these signals are shaped in an amplifier 31 and a single-shot 32 to produce binary type digital signals on the output line 15. Signals on line 15 are coupled through a RC circuit 33 which differentiates the waveform and the positive portions of the differentiated waveform are coupled through diode 34 to the base of a transistor 35. The transistor 35 together with transistor 36 are cross-coupled as a bistable multivibrator or flip-flop. The transistor 36 has applied to its base a positive pulse signal derived by differentiating the output of reference oscillator 18 in RC circuit 37 and coupling the differentiated wave form through diode 38. The state of the flip-flop 35, 36 will be determined by the last received signal at the bases of the respective transistors 35, 36 with that transistor conducting which last received a positive signal at its base.

The flip-flop circuit associated with transistors 35, 36 operates with respect to an isolated ground indicated at 41 which is at a potential with respect to power supply ground 42 established by the setting of contact 43 on voltage divider resistor 44. Adjustment of the contact 43 varies the quiescent direct voltage on lead 28 about which the square wave generated by flip-flop 35, 36 varies. The potential on the collector of transistor 36 is applied through an integrating circuit 45 to lead 28 and thus varies the potential of lead 28 in accordance with the difference in conductivity intervals of the two transistors 35 and 36. In order to decrease the switching time of the flip-flop, the collectors of the transistors 35 and 36 are connected through diodes 46 and 47 respectively to a negative voltage derived from battery 48. Thus the operation of the circuit of FIG. 2 provides an automatically adjusted threshold on lead 28 in accordance with the average value of the square wave appearing on the collector of transistor 36 and this variation in direct potential on lead 28 varies the threshold of the base-line clipper circuit 25. The sense of the adjustment is such as to pass false alarm signals to output line 15 at a substantially constant rate as established by the initial setting of the reference oscillator 18 and the control 43.

Referring now to FIG. 3 the application of the invention to a radar system is shown. The radar 51 may be of the pulse type which scans in azimuth with relatively high powered exploratory pulses of short duration and predetermined repetition rate for producing video output signals having target echoes at predetermined range times relative to the transmitted pulse. These video type signals are applied to the quantitizer 12 the output of which is compared in flip-flop 17′ with the frequency of the reference oscillator 18. In order to eliminate the clutter signals a gate circuit 52 supplying a blanking gate of fixed duration after each transmitted pulse may be interposed between the flip-flop 17′ and an integrator 53. In this manner the output of the integrator 53 is determined by a comparison of the inputs to the flip-flop 17′ without being altered by the disturbing effects of the nearby clutter return signal.

The output of the quantitizer 12 may be applied to a logic circuit 54 which is established to operate upon the quantitized signal in accordance with some predetermined law. For example if a criterion is established that a target will be recognized for a predetermined number of echo pulse returns per beam width of scan such as for example the detection of echo returns for half of the pulses within a scanned beam width then the logic circuit 54 could be arranged to examine the number of pulses in a beam width of scan and produce an output whenever half of those pulse intervals contain echo returns. The effect of the logic circuit 54 operating as just described will be further to reduce the false alarm rate by a large factor since an output of the logic circuit 54 will only obtain when the design criterion has been met by the incoming signal from the quantitizer 12. The output of the logic circuit 54 is to the digital data device 13′. The digital data device 13′ may, for example, provide for remote transmission of the data to a control center.

The quantitized output of the quantitizer 12 is also applied to an analog type integrator 55 where succeeding pulses from true targets are integrated and the output applied to a PPI indicator 56. The PPI indicator 56 thus produces unambiguous target indications since only the integration of true target echoes will provide the signal output from the integrator 55 which will produce an indication on the PPI 56.

Although the invention has been disclosed in the form of the presently preferred embodiments it will be understood that many modifications may be made without departing from the spirit of the invention. In particular the invention may be employed in any other data handling system in which the problem of defining signals which are true signals in the presence of noise is presented. By means of the invention the system may be maintained at maximum sensitivity for the detection of minimum detectable signals under all conditions of operation without introducing the possibility of disrupting the operation of the data utilization device due to a variable false alarm rate. The invention accordingly is to be limited only by the scope of the appended claims.

What is claimed is:

1. In a signaling system having a data producing device which generates a composite signal including data pulses and noise and a data utilization device supplied with components of said signal which exceed an established threshold, means responsive to said components for producing pulse signals, means for generating a stable reference frequency, means for generating triggering signals synchronized with said stable frequency, a flip-flop, means for triggering said flip-flop into alternate states in response to said pulse signals and said triggering signals respectively, means for developing a control signal in accordance with the average state of said flip-flop and means responsive to said control signal for altering said threshold in a manner tending to keep the portion of said components derived from said noise a substantially constant fractional part of all of said components.

2. Apparatus according to claim 1 in which the frequency of said reference oscillator is adjustable.

3. A signaling system comprising a source of composite amplitude signals, means for quantitizing those of said signals having amplitudes exceeding an established level, a source of reference frequency signals, means for comparing the frequencies of said quantitized signals and said reference frequency signals to provide a signal proportional to the difference between said frequencies, and means responsive to said difference signal for adjusting said established level to maintain a predetermined relation between said frequencies.

4. A data system comprising a circuit for passing signals of amplitude above an established threshold, a source of reference frequency, a frequency comparator providing a signal proportional to the difference between the frequency of said passed signals and said reference frequency and means responsive to deviation of said difference signal for adjusting said established threshold in a direction to reduce said deviation.

5. A data system comprising a base-line clipping circuit operating with respect to an applied potential, means for applying signals to said clipping circuit, a flip-flop, means for coupling signals from the output of said clipping circuit to trigger said flip-flop into one state, a source of reference frequency, means responsive to said reference frequency for triggering said flip-flop into the other state, means for integrating the output of said flip-flop to produce a voltage in accordance with the time average of the state of said flip-flop, and means for applying said voltage to alter said potential in a manner which makes the frequency of said signals from the output of said clipping circuit bear a predetermined relation to said reference frequency.

6. A radar system comprising means for deriving a video signal including target echo signals, a base-line clipping circuit operating with respect to an applied potential, means for applying said video signal to said clipping circuit, a flip-flop, means for coupling signals from the output of said clipping circuit to trigger said flip-flop into one state, a source of reference frequency, means responsive to said reference frequency for triggering said flip-flop into the other state, means for integrating the output of said flip-flop to produce a voltage in accordance with the time average of the state of said flip-flop, means for applying said voltage to alter said potential in a manner which makes the output of said clipping circuit bear a predetermined relation to said reference frequency, and means for utilizing the output of said clipping circuit to indicate said echo signals.

7. A radar system comprising means for deriving a video signal including target echo signals, means for quantitizing said video signal with respect to an established threshold, a source of reference frequency, means for comparing the frequency of said source with the average frequency of components of said video signal exceeding said threshold, means for altering said threshold in response to the comparison of said frequencies to keep said average frequency substantially constant and radar signal utilization means responsive to said components.

8. Apparatus according to claim 7 in which said reference frequency is adjustable for selectively controlling said average frequency.

9. Apparatus according to claim 7 in which said radar system is a pulse radar and including a gating circuit synchronized with the repetition rate of said pulse radar for elimination of the effect of clutter echoes from nearby objects on said threshold.

References Cited by the Examiner

UNITED STATES PATENTS

| | | | |
|---|---|---|---|
| 2,715,678 | 8/55 | Barney | 340—347 X |
| 2,860,330 | 11/58 | Giles | 343—17.1 |
| 2,907,027 | 9/59 | Uskavitch | 343—17.1 |

CHESTER L. JUSTUS, *Primary Examiner.*

FREDERICK M. STRADER, *Examiner.*